US006459434B1

(12) United States Patent
Cohen et al.

(10) Patent No.: US 6,459,434 B1
(45) Date of Patent: Oct. 1, 2002

(54) APPARATUS AND METHOD FOR PROGRESSIVELY RENDERED PROCEDURAL TEXTURES

(75) Inventors: Aaron M. Cohen, Beaverton; Christopher L. Gorman, Portland, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/433,825

(22) Filed: Nov. 3, 1999

(51) Int. Cl.[7] .............................. G06T 11/40
(52) U.S. Cl. .................. 345/586; 345/582; 345/660
(58) Field of Search ............................. 345/430, 582, 345/586, 606, 660

(56) References Cited

U.S. PATENT DOCUMENTS

| | | |
|---|---|---|
| 5,481,669 A | 1/1996 | Poulton, et al. |
| 5,808,617 A | 9/1998 | Kenworthy et al. |
| 5,852,443 A | 12/1998 | Kenworthy |
| 5,949,428 A | 9/1999 | Toelle et al. |
| 5,956,043 A | 9/1999 | Jensen |
| 5,999,189 A * | 12/1999 | Kajiya et al. ............... 345/430 |

OTHER PUBLICATIONS

*Texturing& Modeling*, Second Edition, A Procedural Approach, David S. Ebert, et al., 1998, Chapter 1 (Introduction) and Chapter 2 (Building Procedural Textures).

* cited by examiner

Primary Examiner—Matthew Luu
(74) Attorney, Agent, or Firm—Blakely, Sokoloff, Taylor & Zafman LLP

(57) ABSTRACT

Apparatus and method of rendering a texture comprises computing a set of initial pixels to produce an initial version of the texture, which has a low resolution as compared to a final version of the texture. The initial version is scaled using an algorithm wherein each of the initial pixels corresponds to a group of final pixels. The scaling algorithm creates interpolated values for the final pixels in each group. Actual values for the final pixels are computed following a predetermined ordering in which the final pixels in each group are ordered in accordance with a first pseudo-random sequence, and the groups are also ordered in accordance with a second pseudo-random sequence. The interpolated values of the final pixels are progressively replaced with the computed, actual values to arrive at the final version of the texture. An intermediate version of the texture, which includes the set of initial pixels plus a portion of the actual values computed for the final pixels, is provided to a graphics device for texture mapping in accordance with the progressive rendering process.

24 Claims, 3 Drawing Sheets

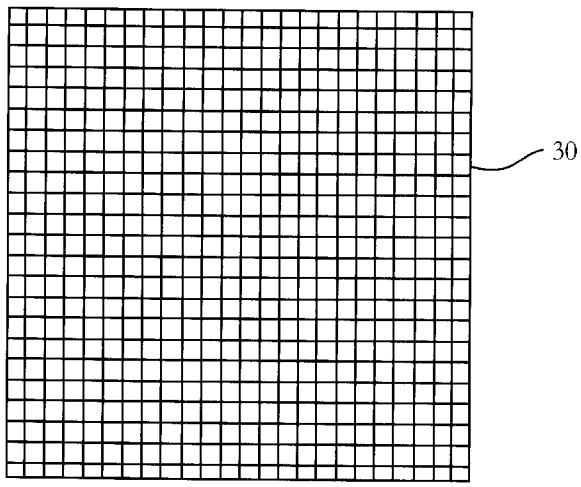
FIG. 3A
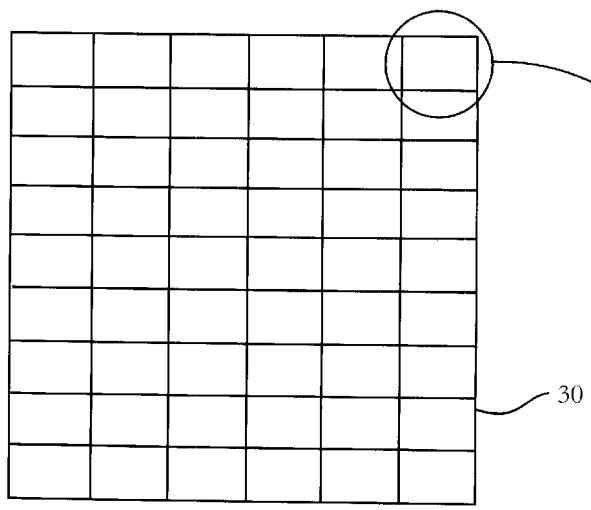
FIG. 3C
FIG. 3B

APPARATUS AND METHOD FOR PROGRESSIVELY RENDERED PROCEDURAL TEXTURES

FIELD OF THE INVENTION

The present invention relates generally to the field of computer graphics. More specifically, to graphics rendering systems and methods for creating realistic three-dimensional (3-D) graphical representations.

BACKGROUND OF THE INVENTION

The use of procedural techniques for three-dimensional texturing (solid texturing), modeling, and shading in computer graphics and animation has grown rapidly over the past decade. It is now possible for three-dimensional objects and shapes created on a personal computer or workstation to be filled in with textures simulating natural materials and natural phenomena. For example, it is now common to display realistic images having textures resembling marble, wood, or stone. Likewise, computer researchers and scientists have successfully simulated natural phenomena such as fog, waves, fire, and clouds for display on a computer screen.

Texturing methods vary the point-to-point surface properties of an object to give the appearance of detail that is not actually present in the geometry. A "texture"—sometimes referred to as a "pattern" or "wallpaper"—is simply an image that used as surface covering for objects or shapes created by a graphics program running on a computer. Textures come in many varieties. Examples include bump mapping, which simulate the appearance of surface bumps without actually modifying the geometry of the object; displacement mapping, in which textures are used actually to move the surface; and solid textures that give consistent textures of all surfaces of an object regardless of distortions of the surface parameter space.

A texture may be explicitly specified by storing all the complex details of the scene or sequence in a bit-map that contains the value of each pixel in the image. This approach obviously requires a large amount of storage space within the computer; but is it well suited for certain representations, such as a reproduction of a famous painting. Alternatively, all of the details of a given texture may be abstracted into a mathematical function or algorithm (i.e., a procedure) that is used to define pixel values. A procedural technique is defined as a code segment or algorithm that specifies some characteristic of computer generated model or effect. A procedural texture, therefore, is an image initially described—not by the pixel values—but by the operation or formula, which may include a random element, used to create the pixel values.

Procedural textures offer certain advantages over bit-mapped textures. For instance, the storage requirements of a procedural texture are generally independent of the number of pixels. That is, a procedural texture can be stored in a storage space that is several orders of magnitude less than the space required to store a corresponding bit-mapped representation. Procedural textures also provide the power of parametric control (sometimes referred to as database amplification) allowing the user to create a variety of textures that can be evaluated to any desired resolution. Procedural techniques further offer the designer the flexibility of creating completely abstract or purely artistic effects that lack resemblance to natural objects. Techniques for building procedural textures are described in "Texturing and Modeling", Second Edition, (Chapter 2) Ebert et al., Academic Press, London (1998). Various methods of using procedural textures in graphics rendering systems are disclosed in U.S. Pat. Nos. 5,956,043, 5,949,428, 5,852,443, 5,808,617, and 5,481,669.

One of the drawbacks of past rendering systems that use procedural textures is the long time it takes the host processor to fully calculate all the pixel values before the image is displayed on the screen. During this calculation period, the viewer is typically left staring at a blank screen. Therefore, what is needed is an efficient method and system that would make the texture pixels available to a graphics display device as soon as possible, while at the same time providing textures of arbitrarily high-resolution.

SUMMARY OF THE INVENTION

The present invention covers an apparatus and method for rendering a texture. In accordance with one embodiment of the invented method, a set of initial pixels are computed to produce an initial version of the texture. The initial version has a low resolution as compared to a later or final version of the texture. Following computation of the set of initial pixels, the initial version is scaled using an algorithm. In scaling, each of the initial pixels corresponds to a group of final pixels. The scaling algorithm creates interpolated values for the final pixels in each group.

After scaling, actual values for the final pixels are computed following a predetermined ordering. The predetermined ordering, in one embodiment, involves ordering the final pixels in each group in accordance with a first pseudo-random sequence. The groups are also ordered in accordance with a second pseudo-random sequence. The interpolated values of the final pixels are progressively replaced with the computed, actual values to arrive at the final version of the texture.

DESCRIPTION OF THE DRAWINGS

The present invention will be understood more fully from the detailed which follows and from the accompanying drawings, which however, should not be taken to limit the invention to the specific embodiments shown, but are for explanation and understanding only.

FIG. 3A illustrates an image comprised of an array of pixels.

FIG. 3B shows the image of FIG. 3A with the pixels arranged as groups. A magnified view of the pixels within a single group is also shown.

FIG. 3C is a larger view of a group with an example pixel position sequence numbering in hexadecimal notation.

DETAILED DESCRIPTION

A graphics rendering system and method of operation is described. In the following description, numerous specific details are set forth, such as specific operating modes, algorithms, settings, etc., in order to provide a thorough understanding of the invention. It will be obvious, however, to one skilled in the art, that these specific details may not be needed to practice the present invention.

Figure 1:
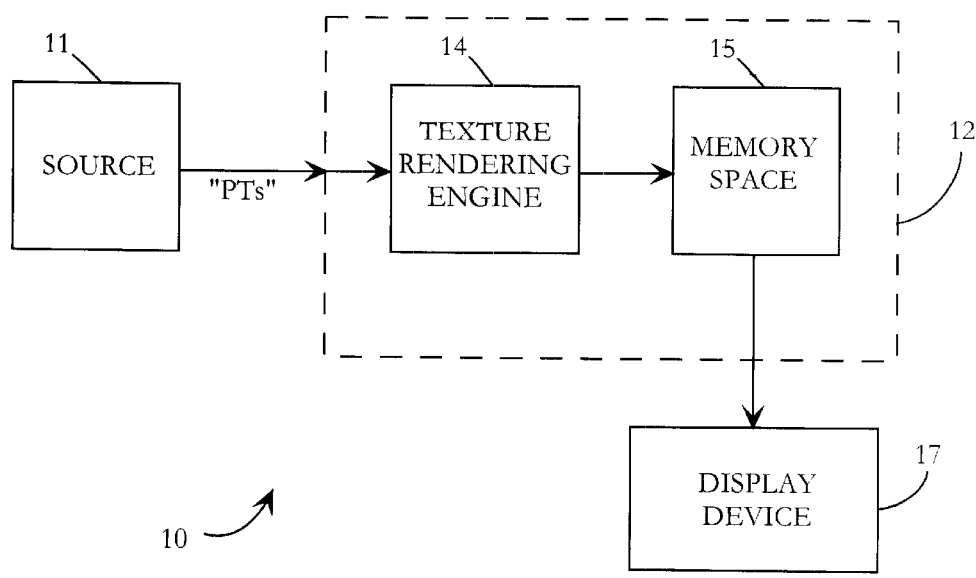
FIG. 1 is a conceptual diagram of a system for rendering textures in accordance with one embodiment of the present invention.

With reference to FIG. 1, there is shown a conceptual diagram of a system 10 for rendering textures in accordance with one embodiment of the present invention. A host processor 12 retrieves a procedural texture from source 11, which may comprise another memory location, a remote computer, a CD-ROM, an Internet web site, or any other similar source. The procedural texture represents an image initially described by the operations used to create the pixel values. For purposes of this discussion, a particular procedural texture may be described by a set of instructions, the form of which could be binary code, compiled Java™ byte-codes, or compressed text listing in a computer language such as Java™, C, or C++. In any case, it is the instructions, and not the pixel values, which are loaded into processor 12 from source 11.

The host application software running on processor 12 passes the texture instructions to a texture-rendering engine 14 along with a desired resolution. Texture rendering engine 14 takes the instructions and constructs the image at desired resolution in memory space 15. Memory space 15 may comprise a recording disk, a video card memory, host AGP memory accessible to the video hardware, or other conventional memory. Memory space 15 is coupled to an ordinary display device 17 for graphical display of the three-dimensional object including the texture. It is appreciated that modern graphics cards provide support to directly map textures onto three-dimensional surfaces.

The basic idea of the present invention is to make the texture pixels (also frequently referred to as "texels") available to the graphics card as soon as possible, while the same time providing textures of arbitrarily high-resolution. Whereas in prior art systems the user typically is required to wait until all pixel values have been calculated, the present invention computes the texels in random units such that the texture is useful for display purposes prior to the time it is fully calculated. Instead of having to wait until all pixels have been fully computed, a low resolution version of the texture is first computed, which is then progressively refined. The progressive rendering process of the present invention gradually sharpens the resolution of the displayed image to the viewer evenly over time. This is achieved, as described in detail below, by generating the texels with enough of a random distribution such that the human eye cannot distinguish differences in sharpness between different sections of the displayed image.

Figure 2:
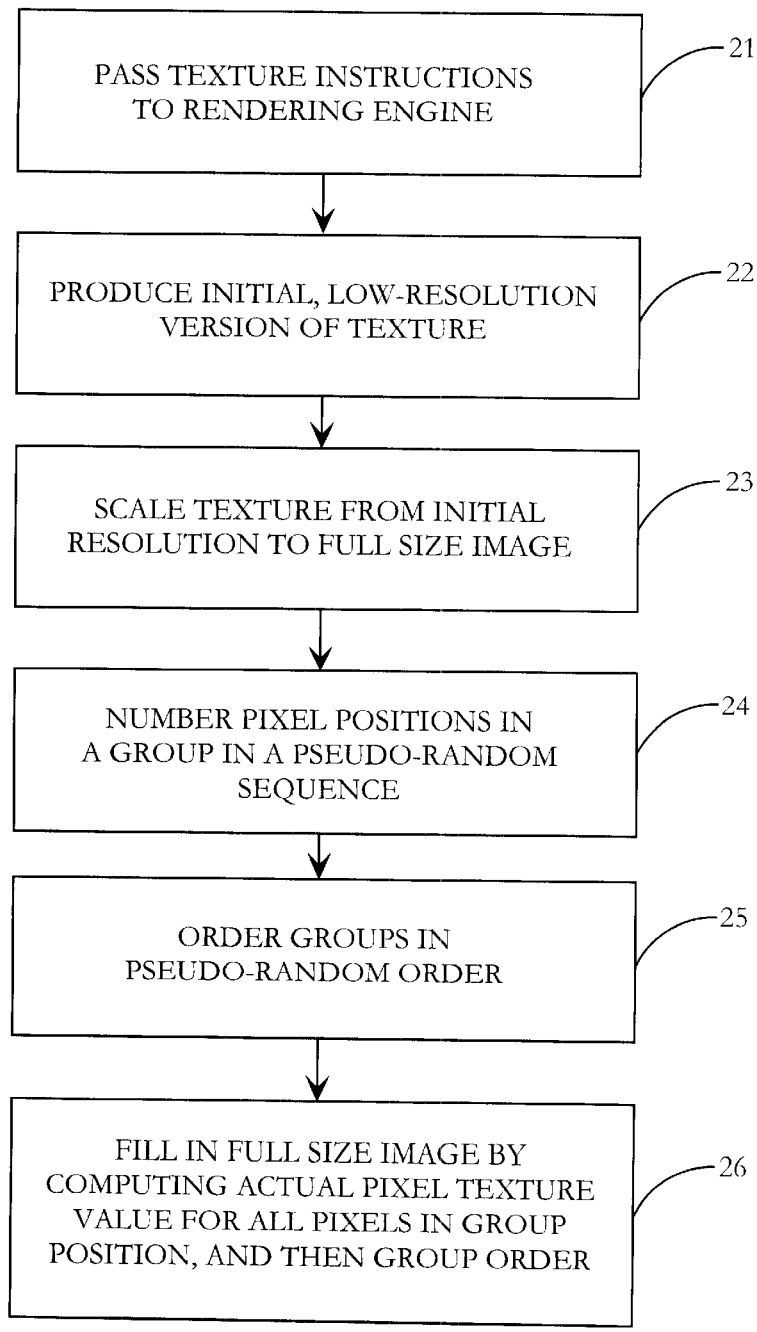
FIG. 2 is a flowchart illustrating a method of rendering texture pixels in accordance with another embodiment of the present invention.

FIG. 2 is a flowchart illustrating a method of rendering texture pixels in accordance with one embodiment of the present invention. Box 21 represents the operation of passing procedural texture instructions to the texture-rendering engine of the host processor. A maximum desired resolution may also included as a programmable parameter and/or scaling factor.

Whereas the final texture is specified to be a certain size (e.g., 512×512), an initial version having a lower resolution of the texture (e.g., 64×64) is first computed. This obviates the need to wait until all of the pixels of the final texture have been computed. Box 22 in FIG. 2 represents the operation of rendering an initial, low-resolution version of the texture. To produce the initial version of the texture, a set of initial pixels are first computed. Practitioners familiar with the computing arts will appreciate this is a relatively fast operation. The initial version of the texture is rendered into the memory space passed in by the application software. As discussed previously, the initial resolution is a system tunable parameter that can be used to scale the software to different systems.

Scaling is represented in the method of FIG. 2 by box 23. The texture-rendering engine scales the texture from the initial, low-resolution version to the to the full-size, final version using an interpolation algorithm. For example, an initial version is first created at a size of, say, 64×64; then that initial version is stretched to full-size, final representation, e.g., 512×512. The scaled initial version consists of 64×64 correctly computed pixel values, along with groups of interpolated pixel values. Upon scaling, each initial pixel corresponds to a group of final pixels, with the algorithm creating interpolated values for the group of final pixels associated with each initial pixel.

The scaling algorithm may comprise a simple pixel replication or bi-linear filtering algorithm. The choice of scaling algorithm is another system tunable parameter. Alternatively, dedicated hardware may be used to scale the texture to its full-size. In any case, the scaling algorithm is typically fast relative to the procedural texture computations.

An important aspect of the present invention is that once the texture has been scaled to full-size, it becomes available to the rendering engine and 3-D graphics card for texture mapping of three-dimensional surfaces. Thus, the low-resolution version is available for viewing on the display device. The remaining operations associated with the invented method relate to the progressive refinement of the initial version of the texture.

After scaling, the texture rendering engine refines the detail of the texture by "filling in" the interpolated values of the final pixels with actual computed values. This filling-in operation may be performed in the background such that the resolution is gradually and progressively sharpened over time until the final version of the texture is eventually fully computed. Filling in the interpolated pixel values with actual computed values is performed following a predetermined order, as described in detail below.

Boxes 24 and 25 in the flowchart of FIG. 2 represent the ordering scheme according to one embodiment of the present invention. Essentially, the ordering scheme is a dithering matrix aimed at progressively calculating and filling-in pixels such that the overall image is produced with a balanced, even sharpness. The concept behind the predetermined ordering of individual pixels is so that the texture appears to the viewer to be filling in evenly from the low resolution, associated with the initial version, to the desired resolution of the final texture. Otherwise, it would be undesirable to have one portion or side of the image filled in before another portion of or side. According to the embodiment of FIG. 2, there are two random operations taking place. First, there is randomness within each group, wherein the pixel positions in each group are assigned a number in a pseudo-random sequence. Box 24 represents this ordering in FIG. 2. The second part of the predetermined ordering involves random sequencing of groups.

To better understand the ordering operations in accordance with the present invention consider the following example. After scaling is completed, there are groups of final pixels corresponding to each initial pixel. Assume, for example, that the initial version of the texture is represented as an array of 64×64 pixels. This set of initial pixels is scaled up to 256×256 pixels, such that each initial pixel is associated with a group of 16 final pixels. This means that each initial pixel has its own group. In the given example, there are 4096 groups. In addition, each final pixel in a group has a corresponding member in each of the other groups. This is because each group has the same number of final pixels, i.e., 16.

According to the flowchart of FIG. 2, each of the pixel positions within a group are numbered according to a first pseudo-random sequence (box 24). This order may be predetermined by the group size. However, the order should be evenly distributed throughout the group (i.e., like in a dithering matrix). One way to order pixel positions within each group is with a pseudo-random number generator that does not repeat any number until all of the numbers within a range has been exhausted.

FIGS. 3A and 3B illustrate this concept, In FIG. 3A there is shown an array of final pixels, with FIG. 3B showing corresponding groupings of the final pixels such that each group contains 16 (see exploded view) final pixels. FIG. 3C illustrates one possible ordering (in hexadecimal) of the pixel positions within a group. As can be seen, the upper left-hand corner pixel is the zero pixel. In this particular example, the left-hand corner pixel ends up being the 15th pixel.

Generally, the upper left-hand pixel with a group is chosen as the zero pixel since most often images are stretched using the upper left-hand pixel as a reference point. Designating the upper left-hand pixel as the zero pixel essentially allows all of final pixels to line up in a registered grid once the image has been fully stretched. Of course, any pixel position with the group may be designated the zero pixel in accordance with the present invention, the foregoing discussion only representing one of many possible embodiments.

The groups are also numbered—this time in accordance with a second pseudo-random ordering, as represented in FIG. 2 by box 25. Note that this second pseudo-random ordering may also be predetermined, the only requirement is that the numbers be evenly distributed among the available range of group indexes. This assures that the texture fills in evenly, with the resolution progressively improving until the actual values of the final pixels have been fully calculated. Again, a pseudo-random number generator that produces every number in a range before repeating any other number may be used to generate the second pseudo-random ordering.

It should be understood that it does not matter whether the pixel positions within each group are ordered first, or after the ordering of the groups. In other words, while FIG. 2 shows the pixel positions being numbered within a group before ordering of the groups themselves, the ordering process may be reversed.

Box 26 in FIG. 2 represents the operation of filling in the pixels by computing the actual pixel texture value for all final pixels according to the order of pixel positions within each group, and then according to inter-group ordering. By way of example, the actual pixel values for all of the position number one pixels are computed individually, beginning with the first group, and continuing through the last group in the ordered sequence. These actual values replace the interpolated values created by the algorithm used to produce the initial version of the texture.

After all of the position number one pixels have been computed and filled-in for all of the groups, the position number two pixels are computed in all groups by group order, followed by the position number three pixels, and so on. In the example presented above, the actual values of the position number 15 pixels are the last to be calculated and filled-in for each group.

In a notational representation, actual values for each final pixel, $P_{ij}$, are computed for j=1 to m and i=1 to n, where i denotes a group number in the second pseudo-random sequence, j denotes a pixel position number in the first pseudo-random sequence, n is a last group number in the second pseudo-random sequence, and m is a last pixel position number in the first pseudo-random sequence.

Because the pixels are basically being filled in randomly, at any given moment the texture appears approximately uniform in resolution. Over time, this resolution improves as more and more pixels are computed, and less and less of the original interpolated values are contained in the memory space. The present invention therefore, allows faster user response. It also obviates the kind of trade-off decisions developers have been forced to make between resolution and delay. Moreover, it is appreciated that the present invention provides flexibility for particular machine configurations by programmable system parameters such as scaling factor, initial resolution, maximum resolution, etc.

We claim:

1. A method of rendering a texture comprising:

computing a set of initial pixels to produce an initial version of the texture, the initial version having a low resolution as compared to a final version of the texture;

scaling the initial version using an algorithm, wherein each initial pixel corresponds to a group of final pixels, the algorithm creating interpolated values for the final pixels in each group;

computing actual values for the final pixels following an order; and replacing the interpolated values with the actual values for the final pixels so that the initial version of the texture is gradually and progressively sharpened until the final version of the texture is rendered.

2. The method according to claim 1 wherein the order comprises:

ordering the final pixels in each group in accordance with a first pseudo-random sequence;

ordering the groups in accordance with a second pseudo-random sequence.

3. The method according to claim 2 wherein the algorithm comprises a pixel replication or bi-linear filtering algorithm.

4. The method according to claim 2 wherein computing the actual values for the final pixels proceeds by:

computing actual values for each final pixel, $P_{ij}$, for j=1 to m and i=1 to n, where i denotes a group number in the second pseudo-random sequence, j denotes a pixel position number in the first pseudo-random sequence, n is a last group number in the second pseudo-random sequence, and m is a last pixel position number in the first pseudo-random sequence.

5. The method according to claim 1 wherein the low resolution of the initial version of the texture is a programmable parameter.

6. The method according to claim 1 wherein the initial version of the texture is scaled by a programmable factor.

7. The method according to claim 1 further comprising:

providing the scaled initial version of the texture to a graphics device for texture mapping of a three-dimensional surface.

8. The method according to claim 1 further comprising:

providing an intermediate version of the texture to a graphics device for texture mapping of a three-dimensional surface, the intermediate version including the set of initial pixels plus a portion of the actual values computed for the final pixels.

9. The method according to claim 4 wherein the first pseudo-random sequence is generated by a pseudo-random number generator that outputs every number in a range from 1 to m before repeating any number.

10. The method according to claim 4 wherein the second pseudo-random sequence is generated by a pseudo-random number generator that outputs every number in a range from 1 to n before repeating any number.

11. A computer-readable storage medium having a configuration that represents data and instructions that cause a processor to:

compute a set of initial pixels to produce an initial version of a texture, the initial version having a low resolution as compared to a final version of the texture;

scale the initial version using an algorithm, wherein each initial pixel corresponds to a group of final pixels, the algorithm creating interpolated values for the final pixels in each group;

compute actual values for the final pixels following an order; and replace the interpolated values with the actual values for the final pixels so that the initial version of the texture is gradually and progressively sharpened until the final version of the texture is rendered.

12. The computer-readable storage medium of claim 11 wherein the medium is further configured to cause the processor to generate the order by:

ordering the final pixels in each group in accordance with a first pseudo-random sequence;

ordering the groups in accordance with a second pseudo-random sequence.

13. The computer-readable storage medium of claim 11 wherein the algorithm comprises a pixel replication or bi-linear filtering algorithm.

14. The computer-readable storage medium of claim 12 wherein the medium is further configured to cause the processor to compute actual values for each final pixel, $P_{ij}$, for j=1 to m and i=1 to n, where i denotes a group number in the second pseudo-random sequence, j denotes a pixel position number in the first pseudo-random sequence, n is a last group number in the second pseudo-random sequence, and m is a last pixel position number in the first pseudo-random sequence.

15. The computer-readable storage medium of claim 11 wherein the low resolution of the initial version of the texture is a programmable parameter.

16. The computer-readable storage medium of claim 11 wherein the initial version of the texture is scaled by a programmable factor.

17. The computer-readable storage medium of claim 11 wherein the medium is further configured to cause the processor to provide the scaled initial version of the texture to a graphics device for texture mapping of a three-dimensional surface.

18. The computer-readable storage medium of claim 11 wherein the medium is further configured to cause the processor to provide an intermediate version of the texture to a graphics device for texture mapping of a three-dimensional surface, the intermediate version including the set of initial pixels plus a portion of the actual values computed for the final pixels.

19. A computer system for texturing a three-dimensional surface of an image comprising:

a memory space;

a texture-rendering engine that creates a texture for the image with a desired resolution in the memory space from a procedural texture defined by a set of instructions;

a graphics device that applies the texture onto the three-dimensional surface;

the texture-rendering engine first computing a set of initial pixels to render an initial version of the texture, the initial version having a low resolution as compared to a final version, the texture-rendering engine then scaling the initial version of the texture by a factor using an algorithm executable in software, wherein each initial pixel corresponds to a group of final pixels, the algorithm creating interpolated values for the final pixels in each group, actual values of the final pixels being computed for replacement of the interpolated values according to an order so that the initial version of the texture is gradually and progressively sharpened until the final version of the texture is rendered.

20. The computer system of claim 19 wherein the initial version comprises an array of 64×64 pixels or smaller.

21. The computer system of claim 19 wherein the algorithm comprises a pixel replication or bi-linear filtering algorithm.

22. The computer system of claim 19 wherein the order and comprises:

a first ordering of the final pixels in each group according to a first pseudo-random sequence;

a second ordering of the groups according to a second pseudo-random sequence.

23. The computer system of claim 19 wherein the memory space comprises a video card memory.

24. The computer system of claim 22 wherein computing the actual values of the final pixels proceeds by computing actual values for each final pixel, $P_{ij}$, for j=1 to m and i=1 to n, where i denotes a group number in the second pseudo-random sequence, j denotes a pixel position number in the first pseudo-random sequence, n is a last group number in the second pseudo-random sequence, and m is a last pixel position number in the first pseudo-random sequence.

* * * * *